(No Model.) 4 Sheets—Sheet 1.
T. G. H. MANN.
REST OR HOLDER FOR BOOKS.
No. 562,473. Patented June 23, 1896.
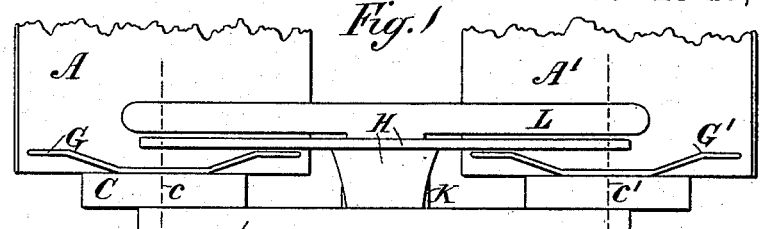
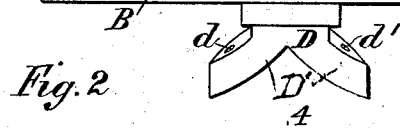
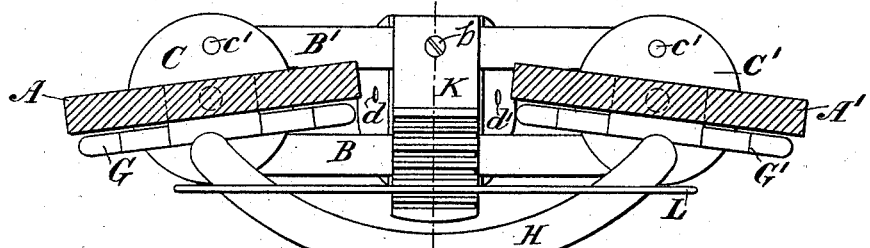
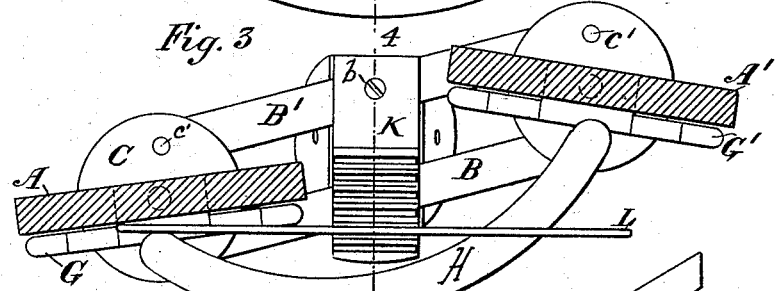
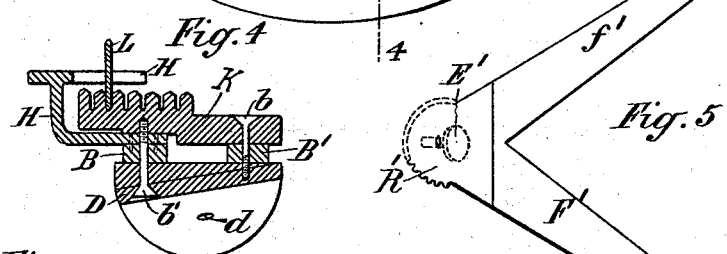
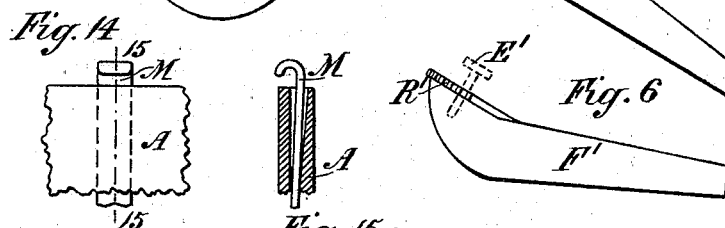
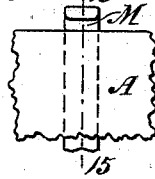
Witnesses
G. M. Binney
F. H. Davis
Inventor
Thomas G. H. Mann
by Harold Binney
atty.
ANDREW B. GRAHAM, PHOTO-LITHO. WASHINGTON, D.C.

(No Model.) 4 Sheets—Sheet 2.
T. G. H. MANN.
REST OR HOLDER FOR BOOKS.
No. 562,473. Patented June 23, 1896.

Witnesses
G. M. Binney
F. H. Davis

Inventor
Thomas G. H. Mann,
by Harold Binney
Atty.

(No Model.) 4 Sheets—Sheet 3.
T. G. H. MANN.
REST OR HOLDER FOR BOOKS.
No. 562,473. Patented June 23, 1896.
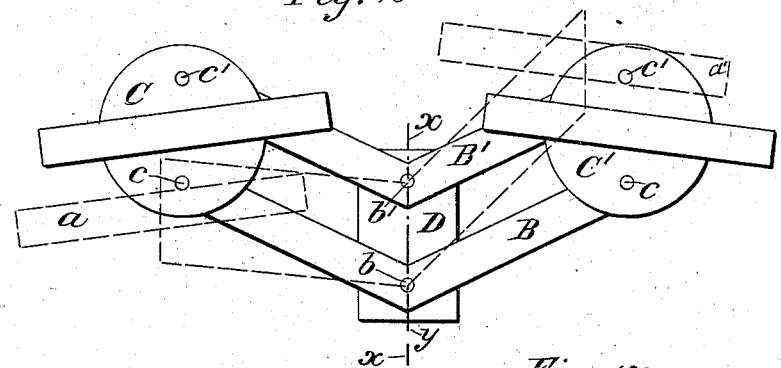
Fig. 16
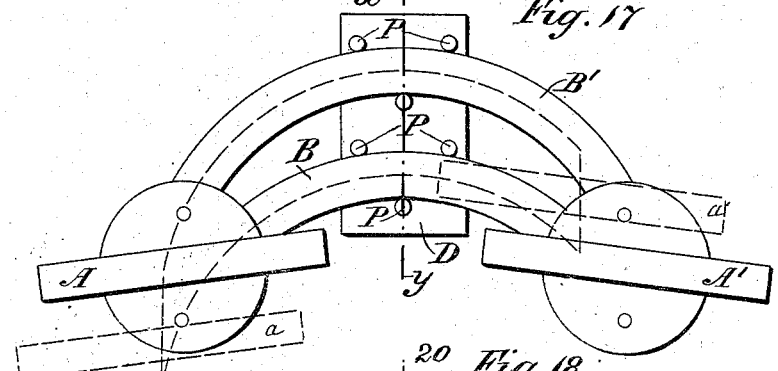
Fig. 17
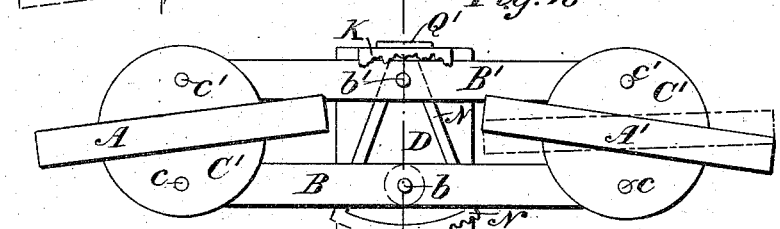
Fig. 18
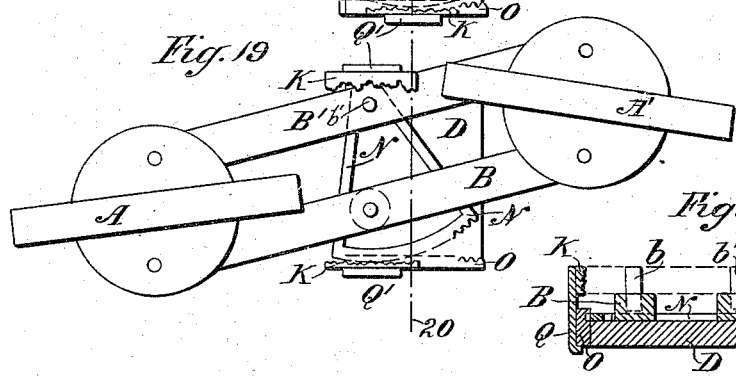
Fig. 19
Fig. 20
Witnesses
Inventor
Thomas G. H. Mann, (No Model.) 4 Sheets—Sheet 4.

T. G. H. MANN.
REST OR HOLDER FOR BOOKS.

No. 562,473. Patented June 23, 1896.

Witnesses  
G. M. Binney  
F. H. Davis

Inventor  
Thomas G. H. Mann  
by Harold Binney  
Atty.

UNITED STATES PATENT OFFICE.

THOMAS GEORGE HENRY MANN, OF LONDON, ENGLAND.

REST OR HOLDER FOR BOOKS.

SPECIFICATION forming part of Letters Patent No. 562,473, dated June 23, 1896.

Application filed November 19, 1895. Serial No. 569,399. (No model.) Patented in England February 14, 1894, No. 3,230.

*To all whom it may concern:*

Be it known that I, THOMAS GEORGE HENRY MANN, a subject of the Queen of Great Britain, and a resident of Balham Hill, London, in the county of Surrey, England, have invented certain new and useful Improvements in Rests or Holders for Books and the Like, (for which I have obtained a patent of Great Britain, No. 3,230, dated February 14, 1894,) of which the following is a specification.

In Letters Patent of the United States of America granted to me November 26, 1895, No. 550,453, I have described an invention in rests or holders for books or the like, which is closely related in some respects to the present invention. In some respects, therefore, the present invention forms an improvement on the subject-matter of that patent.

The nature of the invention will be clearly understood from the drawings, wherein—

Figure 7:
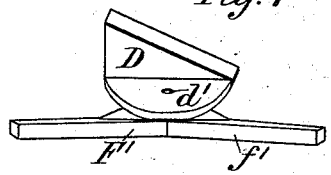
Figure 11:
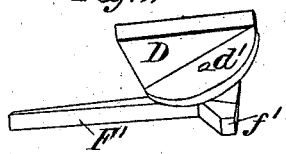
Figure 8:
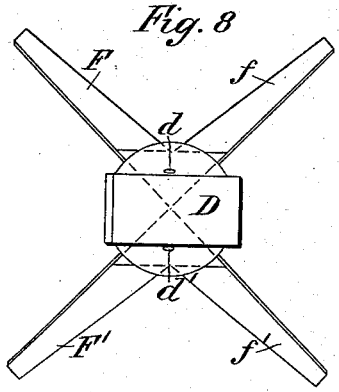
Figure 12:
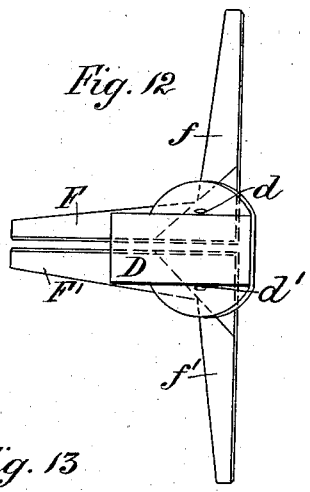
Figure 21:
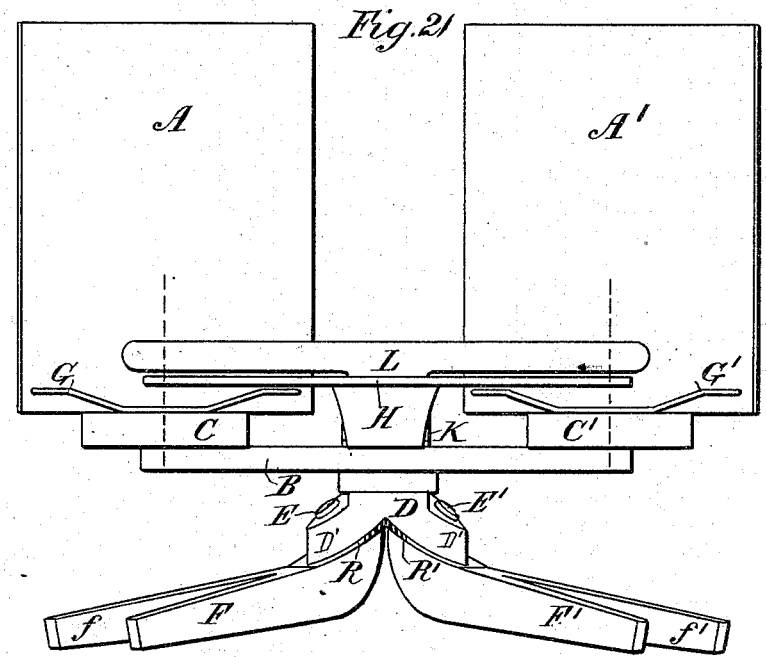
Figure 22:
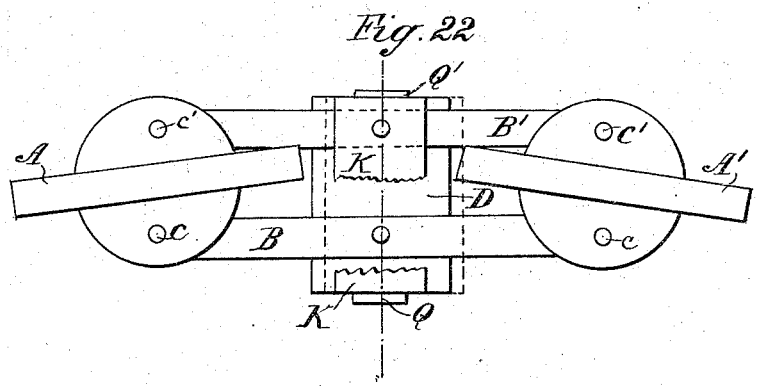

Figure 1 is a front elevation of part of a book rest or holder constructed under my present invention and especially adapted for use on a table. Fig. 2 is a plan of the same with the book-holding wings shown in section. Fig. 3 is a similar plan of the same, showing the parts in different positions from that in Fig. 2. Fig. 4 is a cross-section on the plane 4 4 of Figs. 2 and 3. Fig. 5 is a plan view of one pair of the legs of my holder shown disconnected from the frame. Fig. 6 is a front elevation of the same. Fig. 7 is a diagrammatic side elevation of the body and legs of the holder, showing the legs in normal position. Fig. 8 is a plan, Fig. 9 a front elevation, and Fig. 10 an inverted plan, of the same. Fig. 11 is a side elevation of the body and legs of the holder with the legs in their forward position. Fig. 12 is a plan, and Fig. 13 a rear elevation, of the same. Fig. 14 is a front elevation of a claw attached to the wing. Fig. 15 is a cross-section of the same on the plane 15 15 of Fig. 14. Fig. 16 is a partial plan view of a form of the holder, having V-shaped bent arms. Fig. 17 is a similar view of another form of the holder, having arc-shaped bent arms. Fig. 18 is a diagrammatic plan of a form of holder having parallel straight arms, one of which, by means of a toothed sector, is geared to a rack. Fig. 19 is another plan of the same, showing the parts in a different position. Fig. 20 is a cross-section on the plane 20 20 of Figs. 18 and 19. Fig. 21 is an elevation of the complete book-holder in one of its forms, and Fig. 22 is a partial plan view of a form of the holder with a sliding body portion.

Throughout the drawings like letters refer to like parts.

In the figures, A A' are the wings which carry the book. In all the cases illustrated the supports for these wings consist of two parallel arms or levers B B', this being my preferred construction for obtaining approximately parallel motion. Rigidly fixed to the arm B is an arc-shaped leaf-support or horn H, Figs. 1, 2, 3, and 4. The wings A A' are attached to the arms B B' by means of the arm-plates C C', the pins $c$ $c'$ projecting from the arms into sockets in the arm-plates C C', so as to allow the free play of the parts as the wings are moved backward or forward. The wings A A' are pivotally supported at their centers upon the arm-plates C C' and can be turned at will, as shown in Fig. 18 by dotted lines, to hold and retain the book in a more or less open position.

$b$ $b'$, Fig. 4, are the supporting-pins upon which the arms B B' turn and by means of which the latter are directly or indirectly attached to the upper part of the main support or body D. A pin E', Figs. 5, 6, and 21, connects one pair of legs F' $f'$ to the body D, the pin passing through a hole $d'$ (see Figs. 2, 7, 8, 11, and 12) in one of the inclined sides of the saddle-shaped piece of the body D. A similar pin E connects the opposite pair of legs F $f$ with the body D through the hole $d$, Fig. 4.

Figure 13:
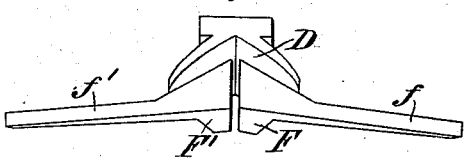
Figure 9:
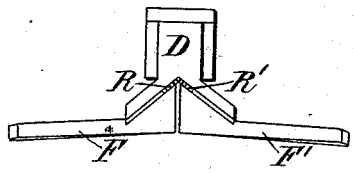

By a comparison of Figs. 7, 8, and 9 with Figs. 11, 12, and 13 it will be seen that when the two front legs F F' are moved toward each other the body D of the holder is inclined forward. This is due to the inclination of the pivots or pins E E' and of the surfaces of the saddle-piece D' of the body D, upon which the legs turn. When on the other hand the legs $f$ $f'$ are approached to each other, the body D is tilted backward. Now when a book is placed upon the holder, the holder but slightly inclined, and the legs in the normal position, Figs. 7, 8, and 9, the center of gravity is approximately over the center of the base. As the book is tilted forward, say a vertical position, by causing legs F F' to move forward and approach, the center of gravity is shifted slightly forward as regards the body of the support, but is still approximately over the center of the base or supports formed by the legs, thereby maintaining stable equilibrium. The same action and balancing is had when the book is tilted backward, though the operations are reversed, the book and the legs both moving back.

Figure 10:
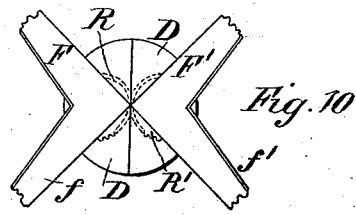

In Figs. 9, 10, and 21 the two pairs of legs are shown geared together so as to work simultaneously by means of two arc-shaped gears R R', gearing into each other and rigidly fixed to the legs.

H, Fig. 1, is a horn or arc-shaped plate, upon which rest the lower edges of the leaves of the book.

G G', Figs. 1, 2, and 3, are spring-supports for the lower edge of the boards or cover of the book.

K is a rack-piece or series of slots, Figs. 2 and 4, which receives a strip or blade L. This strip or blade bears upon the faces of the leaves and retains them in open position. The strip L can be placed in any of the slots in the rack-piece K. The strip L may be conveniently used as a paper-knife when removed from its position in the rack-piece. The rack-piece K is rigidly attached to the body D in this case by the two pins $b\ b'$, Fig. 4, which constitute the pivots for the arms B B', and also serve to secure the horn H in position. The strip L is placed in the most suitable slot of the rack-piece K, Figs. 1, 2, 3, and 4, to retain the leaves of the book in an open and flat position.

In some variations of my invention the bent arms B B' are V-shaped, as in Fig. 16. It will be seen, as shown in dotted lines, that when the V-shaped arms B B' are moved so as to take a book opened at its title-page or beginning (the weight being then nearly all upon the right-hand arm-plate C') the arm-plate C' is brought toward the central line $x\ y$, while the arm-plate C is moved away from it, thereby more equally distributing the weight laterally upon the legs. So, too, it will be seen that in a similar manner the forms of holder illustrated by Figs. 17, 18, and 19 automatically preserve their stability when a book is placed on them. For clearness the rack-piece K is broken away in Figs. 18, 19, and 20, and is omitted from Figs. 16 and 17.

In Fig. 17 the arms B B' instead of being V-shaped and pivoted, as in Fig. 16, are arc-shaped and slide on the rollers P, so that a book opened at the commencement and placed upon the wings A A' will cause them to assume the position shown by the dotted lines $a\ a'$.

In Figs. 18, 19, and 20, N is a toothed sector affixed to and concentric with the pivot of the arm B'. It gears with the rack O, which is mounted upon and rigidly attached to the body D. The arms B B' are pivoted by the pins $b\ b'$ to the rack-piece K, Fig. 20, which is held upon but freely slides over the body D, being kept in position by the upper and lower guides Q Q', firmly attached to its ends.

It will be seen that when the weight of a book bears unevenly upon the arms B B' the descent of the heavier ends of the arms turns the sector N on its fixed rack O and causes the pivot of the sector and the parts attached to it to slide to one side of the central line $x\ y$ in Figs. 18 and 19, and thereby preserve the proper balance.

I may in some cases attach the rack-piece K to the body D solely by the slides Q Q', as in Fig. 22, dispensing with the toothed sector N and the rack O. In such case, of course, the adjustment must be manual and not automatic. The body D is shown by dotted lines in Fig. 22 moved relatively toward one side, though in fact it is the other parts that shift while the body remains fixed.

In Figs. 14 and 15 a portion of the wing A is shown with a claw or hook M of metal placed in its upper edge or end, and sliding in a vertical slot or recess. The claw M can be raised and dropped over the top edge of the book-board to hold it.

The operation of the invention is as follows: Let the body of the holder be in its normal position, (shown in Fig. 7,) with the wings A A' in their normal positions, Figs. 1 and 2, and then let a book be placed upon the wings and opened at the first page. Then the greater part of the weight of the book will be sustained by the wing A', the spring-rest G', and the right-hand side of the horn H. The wing A' will accordingly be depressed and the wing A thereby raised in position, Fig. 3, so that the wing A comes against and supports the front cover or board. The exposed pages of the book will be approximately flat and equally distant from the eyes of the reader, who is assumed to be squarely opposite the book-rest. As now the reader progresses and turns over page after page, the wing A is more and more depressed by the front cover and wing A' more and more elevated (the transfer of weight from A' to A facilitating the adjustment) until, when the last page is reached, the parts will be in the relatively reversed positions to those shown in Fig. 3.

When the holder is in a vertical position and the wings therefore little influenced by the weight of the book, the act of placing the strip L in the rack-piece K and against the open face of the book is sufficient to operate the arms. The two wings A A' may now be turned on the arm-plates C C' to hold the book opened at any angle desired, Fig. 18. The upper surface of the leaf-supporting horn H should be above the level of the arm-plates C C', preferably a height considerably in excess of the usual amount which the cover or boards of a book project at the foot of the leaves. This is in order that the boards may rest upon the spring-rests G G', Fig. 1, unless the book is of sufficient weight to strain the binding when supported only by the board edges in a vertical position. In case of a heavy book, however, the springs will yield until the leaves rest upon the leaf-support or horn H, which then shares the weight of the book with the spring-rests G G' and thus relieves the strain.

If the horn H is omitted, the weight of the book (if vertical) must be supported entirely by the boards.

If now it be desired to incline the book forward or backward, the adjustment of the legs already described accomplishes the inclination desired, at the same time automatically preserving the equilibrium.

From the foregoing description and the drawings it is clear that many distinct adjustments and automatic actions are present in my improved book-holder. Among the most important of these are: the tilting forward and backward by means of the legs, the automatic preservation of balance upon such tilting, the relative angular adjustment of the wings, the lateral shifting of the wings upon the body and legs to preserve the balance as the leaves are turned over, the support of light books by the boards or covers and spring-rests G G', and the joint support of the leaves and boards of heavy books, and the accomplishing of these several independent adjustments while preserving the great simplicity in construction which characterizes the new holder.

I have now set forth the invention in some of its preferred forms. I have purposely omitted the enumeration of such matters of detail or of mere variation as would tend to obscure rather than make clear the more essential features of the invention.

I claim, however, and desire to secure by these Letters Patent, the following:

1. In a rest or holder for books or the like, the combination of two wings or supports, a rocking arm or arms, means for supporting and carrying the said rocking arm or arms, and springs to support the boards or covers of a book when placed on the said wings, substantially as set forth.

2. In a rest or holder for books or the like, the combination of the two wings, the two rest-plates, a rocking arm or arms to which the said rest-plates are attached, and the retaining device consisting of a strip and a leg-piece for receiving and holding the said strip in different positions, substantially as set forth.

3. In a rest or holder for books or the like, and in combination with the body or main support thereof, the legs turning on inclined pivots or axes whereby the said rest or holder and the said legs will be simultaneously turned forward or turned backward thereby tending to preserve the balance, substantially as set forth.

4. The rest or holder for books or the like, supported upon suitable legs, said legs being adjustable relatively to the said holder, and means for causing the tilting of the said holder by the adjustment of the said legs, substantially as set forth.

5. In combination in a rest or holder for books or the like, the two wings, means for giving reciprocal parallel motion to the said wings, and means for inclining or angularly adjusting the said wings to each other whereby a book may be supported in a more or less open position without interfering with the parallel motion of the covers as the pages are turned over, substantially as set forth.

6. In a rest or holder for books or the like, the combination of two rest-plates, as C C', and means for giving reciprocal parallel motion to the said rest-plates, and the two wings A A' supported by and angularly adjustable upon the two said rest-plates, substantially as set forth.

7. The combination with a rest or holder for books or the like, provided with two supporting-wings having a substantially parallel relative motion, of means for laterally shifting the said wings to preserve the balance as the leaves of the book are turned over, substantially as set forth.

8. The combination with a rest or holder for books or the like, provided with two supporting-wings having a substantially parallel relative motion, of means coöperating with and actuated by the said parallel motion to laterally shift the said wings and preserve the balance as the leaves of the book are turned over, substantially as set forth.

9. In combination in a rest or holder for books or the like, means for supporting the said books, a suitable base or legs therefor, and means for laterally shifting the book with its supports, upon the said base, to preserve the equilibrium as the leaves are turned over, substantially as set forth.

10. In combination in a rest or holder for books or the like, the wings or other supports for receiving the covers or boards of the said books, spring-rests, as G G', for the lower edges of the said covers or boards, and the leaf-rest for the lower edges of the leaves of such books, the said springs yielding in the case of heavy books to permit the leaves to come in contact with the said leaf-rest, substantially as set forth.

11. In combination in a rest or holder for books or the like, supports for the edges of the boards or covers of the books, (as at G G') separate support or supports for the edges of the leaves, the said supports for the edges of the boards of cover and for the leaves yielding relatively to each other, whereby, in the case of heavy books, they will both contribute to the support of the book and thereby relieve the strain, substantially as set forth.

In testimony whereof I have hereunto set my hand this 6th day of November, 1895, in the presence of the two subscribing witnesses.

THOMAS GEORGE HENRY MANN.

Witnesses:
ERNEST J. ECKERSLEY,
ARTHUR T. TUCK.